(12) United States Patent
Bruvier et al.

(10) Patent No.: US 11,737,187 B2
(45) Date of Patent: Aug. 22, 2023

(54) AVERAGE INDUCTOR CURRENT CONTROL WITH OPEN- AND CLOSED-LOOP REGULATION

(71) Applicant: SEMICONDUCTOR COMPONENTS INDUSTRIES, LLC, Phoenix, AZ (US)

(72) Inventors: Damien Bruvier, Colomiers (FR); Dominique Romeo, Montauban (FR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/654,958

(22) Filed: Mar. 15, 2022

(65) Prior Publication Data

US 2022/0312561 A1 Sep. 29, 2022

Related U.S. Application Data

(60) Provisional application No. 63/200,744, filed on Mar. 25, 2021.

(51) Int. Cl.
*H05B 45/345* (2020.01)
*H05B 45/14* (2020.01)

(52) U.S. Cl.
CPC .......... *H05B 45/345* (2020.01); *H05B 45/14* (2020.01)

(58) Field of Classification Search
CPC ...... H05B 45/345; H05B 45/14; H05B 45/37; H05B 45/30
See application file for complete search history.

(56) References Cited

U.S. PATENT DOCUMENTS 10,784,783 B1 * 9/2020 Harshey .............. H02M 3/1588
2019/0098716 A1 * 3/2019 DeJonge ................ H05B 45/44
(Continued)

FOREIGN PATENT DOCUMENTS

CN 205648093 U 10/2016
WO WO-2013167695 A2 * 11/2013 ............. H02M 1/14
WO WO-2015070099 A1 * 5/2015 ............. H02M 1/08

OTHER PUBLICATIONS

German Search Report completed Jan. 11, 2023 for German Application No. 102022106626.6, 11 pages.
(Continued)

*Primary Examiner* — Abdullah A Riyami
*Assistant Examiner* — Syed M Kaiser
(74) *Attorney, Agent, or Firm* — Dickinson Wright PLLC; Mark E. Scott

(57) ABSTRACT

Average inductor current control with open- and closed-loop regulation. One example is a method of operating an LED module, the method comprising: controlling, by an on-off controller, a high-side FET and a low-side FET to create a plurality of charge modes and discharge modes of an inductor coupled to an LED of the LED module, each charge mode ends at a peak current indicated by a signal applied to a peak-current input of the on-off controller; driving, by an open-loop regulator, a zenith-current signal to the peak-current input, the open-loop regulator calculates the zenith-current signal for each charge mode without using a feedback signal indicative of current through the LED; and driving, by a closed-loop regulator, a peak-current signal to the peak-current input, the closed-loop regulator calculates the peak-current signal for each charge mode based on the feedback signal indicative of current through the LED.

20 Claims, 8 Drawing Sheets

(56) References Cited

U.S. PATENT DOCUMENTS

2020/0337132 A1* 10/2020 Chitta .................. H05B 45/327
2020/0377132 A1   12/2020 Kitajima et al.

OTHER PUBLICATIONS

On Semiconductor, "Power Ballast and Dual LED Driver for Automotive Front Lighting," Data Sheet NCV78663, Rev. 1, Aug. 2013, Copyright 2013.
On Semiconductor, "Power Ballast and Dual LED Driver for Automotive Front Lighting 2nd Generation," Data Sheet NCV78763, Rev 9, Copyright 2015.
On Semiconductor, "High Efficiency Buck Dual LED Driver with Integrated Current Sensing for Automotive Front Lighting," Data Sheet NCV78723, Rev. 4, Copyright 2015.
On Semiconductor, "High Efficiency Buck Single LED Driver with Integrated Current Sensing for Automotive Front Lighting," Data Sheet NCV78713, Rev. 1, Copyright 2015.
On Semiconductor, "High Efficiency 3A Synchronous Buck Du8l LED Driver with Integrated High Side Switch and Current Sensing for Automotive Front Lighting," Data Sheet NCV78725, Rev. 1, Copyright 2017.
Micrel, Inc., "High-Brightness LED Driver Controller with Fixed-Frequency Hysteretic Control," Data Sheet MIC3205, Oct. 2012.

* cited by examiner

AVERAGE INDUCTOR CURRENT CONTROL WITH OPEN- AND CLOSED-LOOP REGULATION

CROSS-REFERENCE TO RELATED APPLICATIONS

This application claims the benefit of U.S. Provisional Application No. 63/200,744 filed Mar. 25, 2021 and titled "Feedforward method for average current regulation." The provisional application is incorporated by reference here as if reproduced in full below.

BACKGROUND

Light-emitting diodes (LEDs) are increasingly popular for lighting systems for a variety of reasons. The reasons may include greater light produced per unit of energy supplied to the LED (compared, for example, to incandescent bulbs), and controllability of the LEDs. The increased popularity of LEDs is also true for the automotive industry.

At least in the context of the automotive industry, in many cases LEDs are controlled by controlling average current through the LEDs. To reduce electromagnetic interference, the regulation may be by way of a fixed-frequency control scheme. However, fixed-frequency control schemes may suffer from poor dynamic response, such as when responding to large swings of the input voltage that may be caused, for example, by engaging the starter of the automobile's motor.

Any method and/or system which improves dynamic response would provide a competitive advantage in the marketplace.

SUMMARY

One example is a method of operating an LED module, the method comprising: controlling, by an on-off controller, a high-side FET and a low-side FET to create a plurality of charge modes and discharge modes of an inductor coupled to an LED of the LED module, each charge mode ends at a peak current indicated by a signal applied to a peak-current input of the on-off controller; driving, by an open-loop regulator, a zenith-current signal to the peak-current input, the open-loop regulator calculates the zenith-current signal for each charge mode without using a feedback signal indicative of current through the LED; and then driving, by a closed-loop regulator, a peak-current signal to the peak-current input, the closed-loop regulator calculates the peak-current signal for each charge mode based on the feedback signal indicative of current through the LED.

In the example method, driving the zenith-current signal may further comprise calculating, by the open-loop regulator, the zenith-current signal based on an average-current setpoint and a voltage at a switch node of the LED module.

In the example method, driving the zenith-current signal may further comprise creating, by the open-loop regulator, the zenith-current signal based on an average-current setpoint and a peak increment indicative of a difference between the average-current setpoint and a zenith current.

In the example method, driving the zenith-current signal may further comprise creating, by the open-loop regulator, the zenith-current signal based on an average-current setpoint, a peak increment indicative of a difference between the average-current setpoint and a zenith current, and a compensation increment indicative of slope compensation.

The example method may further comprise switching from driving the zenith-current signal to driving the peak-current signal when a regulation signal indicates stabilization of the closed-loop regulator.

The example method may further comprise, after driving the peak-current signal, driving the zenith-current signal by the open-loop regulator when a regulation signal indicates the closed-loop regulator has lost stabilization.

In the example method, controlling the high-side FET and the low-side FET may further comprise applying slope compensation to the peak-current input, and ending each charge mode at the peak current determined based on the peak-current input and the slope compensation.

Another example is an LED driver comprising: a setpoint terminal, an input-voltage terminal, a switch-node terminal, and a return terminal; a high-side FET defining a drain coupled to the input-voltage terminal, a source coupled to the switch-node terminal, and a high gate; a low-side FET defining a drain coupled to the switch-node terminal, a source coupled to the return terminal, and a low gate; an on-off controller defining a peak-current input and coupled to the high gate and the low gate, the on-off controller configured to: assert the high gate and de-assert the low gate to create charge modes of an inductor, and each time a peak current indicated by a signal applied to the peak-current input is reached, de-assert the high gate and assert the low gate to create discharge modes of the inductor; a multiplexer defining a closed-loop input, an open-loop input, a select input, and a select output, the select output coupled to the peak-current input; a closed-loop regulator coupled to the closed-loop input, the closed-loop regulator configured to drive a peak-current signal to the closed-loop input, the peak-current signal created based on a feedback signal indicative of current to the switch-node terminal; and an open-loop regulator coupled to the open-loop input, the open-loop regulator configured to drive a zenith-current signal to open-loop input, the zenith-current signal created without using the feedback signal.

The example LED driver may further comprise a detector coupled to the select input of the multiplexer, the detector configured to assert the select input upon detection that the closed-loop regulator is stabilized.

The example LED driver may further comprise a detector coupled to the select input of the multiplexer, the detector configured to de-assert the select input upon detection that the closed-loop regulator is out of stabilization.

In the example LED driver, when the open-loop regulator drives the zenith-current signal, the open-loop regulator may be further configured to calculate the zenith-current signal based on an average-current setpoint and a voltage at the switch-node terminal.

In the example LED driver, when the open-loop regulator drives the zenith-current signal, the open-loop regulator may be further configured to create the zenith-current signal based on an average-current setpoint and a peak increment indicative of a difference between the average-current setpoint and an expected peak current.

In the example LED driver, when the open-loop regulator drives the zenith-current signal, the open-loop regulator may be further configured to create the zenith-current signal based on an average-current setpoint, a peak increment indicative of a difference between the average-current setpoint and an expected peak current, and a compensation increment indicative of slope compensation.

In the example LED driver, the on-off controller may be further configured to apply a slope compensation to a signal received on the peak-current input, and end each charge mode at the peak current determined based on the peak-current input and the slope compensation.

Yet another example is an LED module comprising: an LED; an inductor defining a first lead coupled to an anode of the LED, and a second lead defining a switch node; a setpoint resistor defining a first lead coupled to a reference voltage and a second lead, a resistance of the setpoint resistor is proportional to an average-current setpoint for the LED; and a driver. The driver may comprise: a high-side FET defining a drain coupled to a voltage input, a source coupled to the switch node, and a high gate; a low-side FET defining a drain coupled to the switch node, a source coupled to a return, and a low gate; an on-off controller defining a peak-current input and coupled to the high gate and the low gate, the on-off controller configured to: assert the high gate and de-assert the low gate to create charge modes of the inductor; and each time a peak current indicated by a signal applied to the peak-current input is reached, de-assert the high gate and assert the low gate to create discharge modes of the inductor; a multiplexer coupled to the peak-current input and defining an open-loop input, a closed-loop input, and a select input; a closed-loop regulator configured to drive a peak-current signal to the closed-loop input, the peak-current signal created based on a feedback signal indicative of current to the switch node; and an open-loop regulator configured to drive a zenith-current signal to the open-loop input, the zenith-current signal created without using the feedback signal.

The example LED module may further comprise a detector configured to assert the select input upon detection that the closed-loop regulator is stabilized.

In the example LED module, when the open-loop regulator drives the zenith-current signal, the open-loop regulator may be further configured to create the zenith-current signal based on the average-current setpoint and a voltage at the switch node.

In the example LED module, when the open-loop regulator drives the zenith-current signal, the open-loop regulator may be further configured to create the zenith-current signal based on the average-current setpoint and a peak increment indicative of a difference between the average-current setpoint and an expected peak current.

In the example LED module, when the open-loop regulator drives the zenith-current signal, the open-loop regulator may be further configured to create the zenith-current signal based on the average-current setpoint, a peak increment indicative of a difference between the average-current setpoint and an expected peak current, and a compensation increment indicative of slope compensation.

In the example LED module, the on-off controller may be further configured to apply a slope compensation to a signal received on the peak-current input, and end each charge mode at the peak current determined based on the peak-current input and the slope compensation.

BRIEF DESCRIPTION OF THE DRAWINGS

For a detailed description of example embodiments, reference will now be made to the accompanying drawings in which.

DEFINITIONS

Figure 1:
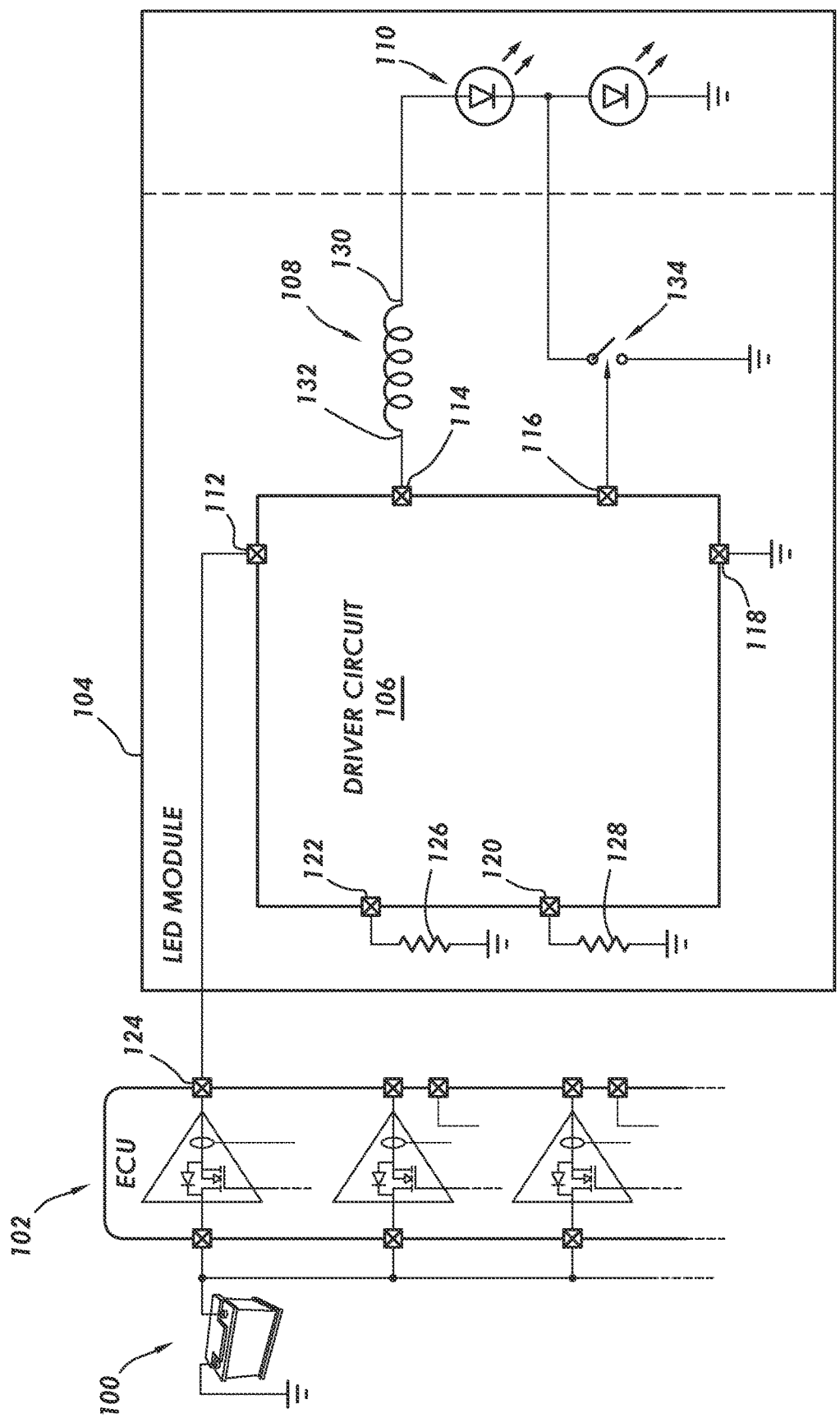
FIG. 1 shows a block diagram of an LED module in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device is coupled to a second device, that connection may be through a direct connection or through an indirect connection via other devices and connections.

"About" shall mean the +/−10% (ten percent) of the recited value or value of a recited parameter.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), the "inputs" and "outputs" define electrical connections. In systems implemented in software, the "inputs" and "outputs" define parameters read by or written by, respectively, the instructions implementing the function.

"LED" shall mean light-emitting diode.

"FET" shall mean field-effect transistor, such as a metal-oxide semiconductor FET (MOSFET).

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to inductor current control with open- and closed-loop regulation. More particularly, various examples are directed to switch-mode power converters or switch-mode power supplies (SMPS) driving one or more average-current loads (e.g., LEDs) using average-current control. More particularly still, various examples are directed to LED modules with driver circuits that operate in one of two modes: in a first or closed-loop mode, such as in the absence of an excursion of the input voltage, the drive circuit uses closed-loop regulation that calculates peak current for each charge mode based a feedback signal indicative of current through an inductor; and in a second or open-loop mode, such as during initial startup of the LED module and/or during input voltage excursions, the driver circuit uses open-loop regulation that calculates zenith current for each charge mode in an open-loop sense, using the average-current setpoint and without using the feedback signal indicative of average current through the inductor. In this way, example driver circuits can utilized fixed frequency operation, yet still be responsive to startup conditions and/or input voltage excursions. The specification first turns to a high-level system overview to orient the reader.

FIG. 1 shows a block diagram of an example system. The system of FIG. 1 is provided in an automotive context, and comprises a battery 100 (e.g., 12V automotive battery), an engine control unit (ECU 102), and an example LED module 104. The example LED module 104 comprises an LED driver or driver circuit 106, an inductor 108, and LEDs 110. In some situations, the LED module 104 is a single integrated component (e.g., all devices disposed on one underlying circuit board), but in other situations the LEDs 110 may be disposed on their own underlying structure (e.g., a bulb assembly) apart from the driver circuit 106 and inductor 108, as illustrated by the dashed line in the figure.

The example driver circuit 106 comprises an input-voltage terminal 112, a switch-node terminal 114, a bypass terminal 116, a ground-reference terminal 118, an indicator terminal 120, and a setpoint terminal 122. Additional terminals may be present (e.g., enable terminal, serial-communication terminal, diagnostic terminal, and/or a fault terminal), but the additional terminals are omitted so as not to unduly complicate the figure. The input-voltage terminal 112 is coupled to a drive output 124 of the ECU 102. In the example shown, the ECU 102 turns on the LEDs 110 by providing the battery voltage (e.g., 12V) to the input-voltage terminal 112, and correspondingly turns off the LEDs 110 by removing the battery voltage from the input-voltage terminal 112. The ground-reference terminal 118 is coupled to a ground reference (e.g., return terminal of the battery 100). The setpoint terminal 122 is coupled to a resistor 126, and the resistor 126 is coupled to the ground reference. In the example system, the resistance of the resistor 126 sets or is proportional to an average-current setpoint for the LEDs 110. In other cases, however, the average-current setpoint may be communicated to the driver circuit 106 in other forms, such as by way of serial communications. The indicator terminal 120 is coupled to a resistor 128, and the resistor 128 is coupled to the ground reference. In the example system, the resistance of the resistor 128 is proportional to the inductance of the inductor 108. Stated otherwise, the driver circuit 106 is provided an indication of the magnitude of the inductance of the inductor 108 by way of the resistor 128. In other cases, however, the indication of the magnitude of the inductance may be communicated to the driver circuit 106 in other forms, such as by way of serial communications.

The inductor 108 defines a first lead 130 coupled to an anode of one of the LEDs 110, and a second lead 132 defining a switch node and thus coupled to the switch-node terminal 114. In the example system, the LEDs 110 are shows as two individual LEDs connected in series. However, one more LEDs may be used, and when two or more LEDS are used, the LEDs may be connected in series, in parallel, and/or a plurality of series-connected LEDs connected in parallel. The example LED module 104 comprises an electrically-controlled switch (hereafter switch 134) illustratively shown as a single-pole, single throw mechanical switch; however, in practice the switch 134 may be implement using a relay or a transistor (e.g., a FET). The switch 134 has a first connection coupled between the example LEDs 110, a second connection coupled to the ground reference, and a control input coupled to the bypass terminal 116. When the switch 134 is conductive, the lower LED is effectively bypassed. In some cases, bypass terminal 116 may be asserted, and thus the switch 134 made conductive, at the command of the ECU 102 (e.g., to dim the light provided by the LEDs 110). The control input from the ECU 102 commanding the driver circuit 106 to assert the bypass terminal 116 is not specifically shown so as not to further complicate the figure. The bypass terminal 116 and switch 134 are shown, however, because when the switch 134 is made conductive and one (or more) LEDs are bypassed, such may cause a disturbance in the regulation that triggers an open-loop control regulation, discussed in detail below.

In various examples, when enabled (e.g., by providing the battery voltage to the input-voltage terminal 112) the driver circuit 106 and the inductor 108 apply electrical current to the anode of an upper LED of the LEDs 110. More particularly, the driver circuit 106 and the inductor 108 create a time-varying current that defines a sawtooth pattern or sawtooth waveform. During periods of time when the current is rising as part of the sawtooth (e.g., charge modes of the inductor 108), current through the LEDs 110 is rising. During periods of time when the current is falling as part of the sawtooth (e.g., discharge modes of the inductor 108), current through the LEDs 110 is falling. However, the average current driven through the LEDs 110 (considering both the rising and falling currents over a plurality of cycles) is controlled to the average-current setpoint. In example cases, and as shown, the average-current setpoint is set or fixed by the resistor 126.

Figure 2:
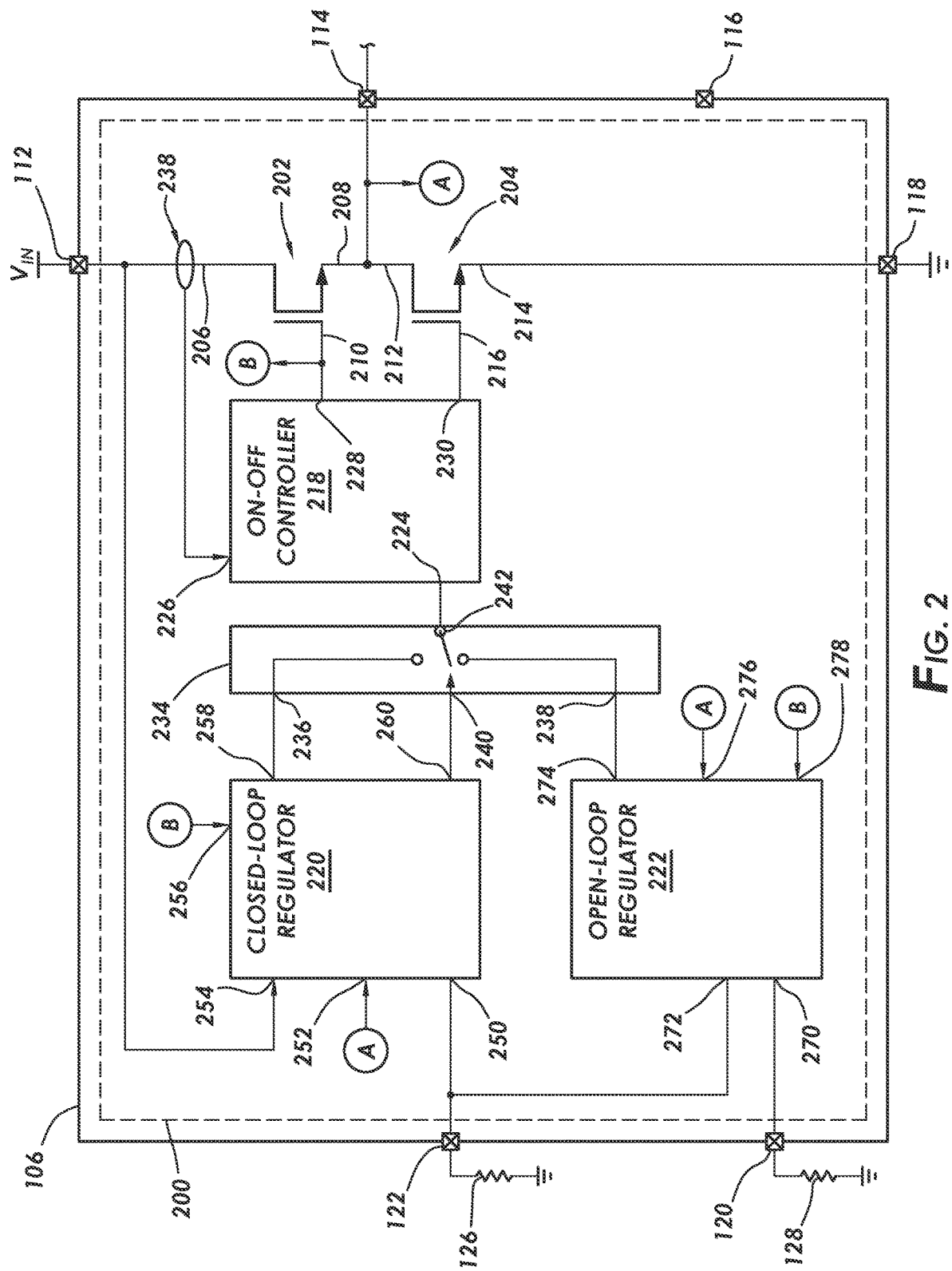
FIG. 2 shows a block diagram of a driver circuit in accordance with at least some embodiments.

FIG. 2 shows a block diagram of an example driver circuit 106. FIG. 2 shows that the driver circuit 106 may comprise one or more substrates of semiconductor material (e.g., silicon), such as substrate 200, encapsulated within packaging. Bond pads or other connection points of the substrate 200 couple to the electrical terminals of the driver circuit 106 (e.g., terminals 112, 114, 116, 118, 120, and 122). While a single substrate 200 is shown, in other cases multiple substrates may be combined to form the driver circuit 106 (e.g., a multi-chip module), and thus showing a single substrate 200 shall not be construed as a limitation.

The example driver circuit 106 comprises a high-side FET 202 and a low-side FET 204. The high-side FET 202 defines a current input coupled to the input-voltage terminal 112, a current output coupled to the switch-node terminal 114, and a control input. In one example, the high-side FET 202 is N-channel MOSFET, thus the current input is the drain 206, the current output is the source 208, and the control input is the gate 210. The low-side FET 204 defines a current output coupled to the switch-node terminal 114, a current input coupled to the ground-reference terminal 118, and a control input. In one example, the low-side FET 204 is also an N-channel MOSFET, and thus the current output is the drain 212, the current input is the source 214, and the control input is the gate 216.

The example driver circuit 106 further comprises an on-off controller 218, a closed-loop controller or closed-loop regulator 220, and an open-loop controller or open-loop regulator 222. The example on-off controller 218 defines a peak-current input 224, a current-sense input 226 coupled to a current sensor 232 (e.g., current transformer), a high-drive output 228 coupled to the gate 210 of the high-side FET 202, and a low-drive output 230 coupled to the gate 216 of the low-side FET 204. The on-off controller 218 is designed and constructed to assert the high-drive output 228 and thus the gate 210 and de-assert the low-drive output 230 and thus the gate 216 to create charge modes of the inductor 108. During the charge modes, current flows from the input-voltage terminal 112, through the high-side FET 202 to the switch-node terminal 114, and then through the inductor 108 (FIG. 1) and the LEDs 110 (FIG. 1). In the example system, the current sensor 232 is designed constructed to be sensitive to current flowing during charge modes when the high-side FET 202 is conductive. The on-off controller 218 is further designed and constructed to sense current in each charge mode by way of the current-sense input 226, and each time a peak current indicated by a signal applied to the peak-current input 224 is reached, de-assert the high gate 210 and assert the low gate 216 to create discharge modes of the inductor 108. During the discharge modes, current flows from the ground reference, through the low-side FET 204 to the switch-node terminal 114, and then through the inductor 108 and the LEDs 110.

Figure 3:
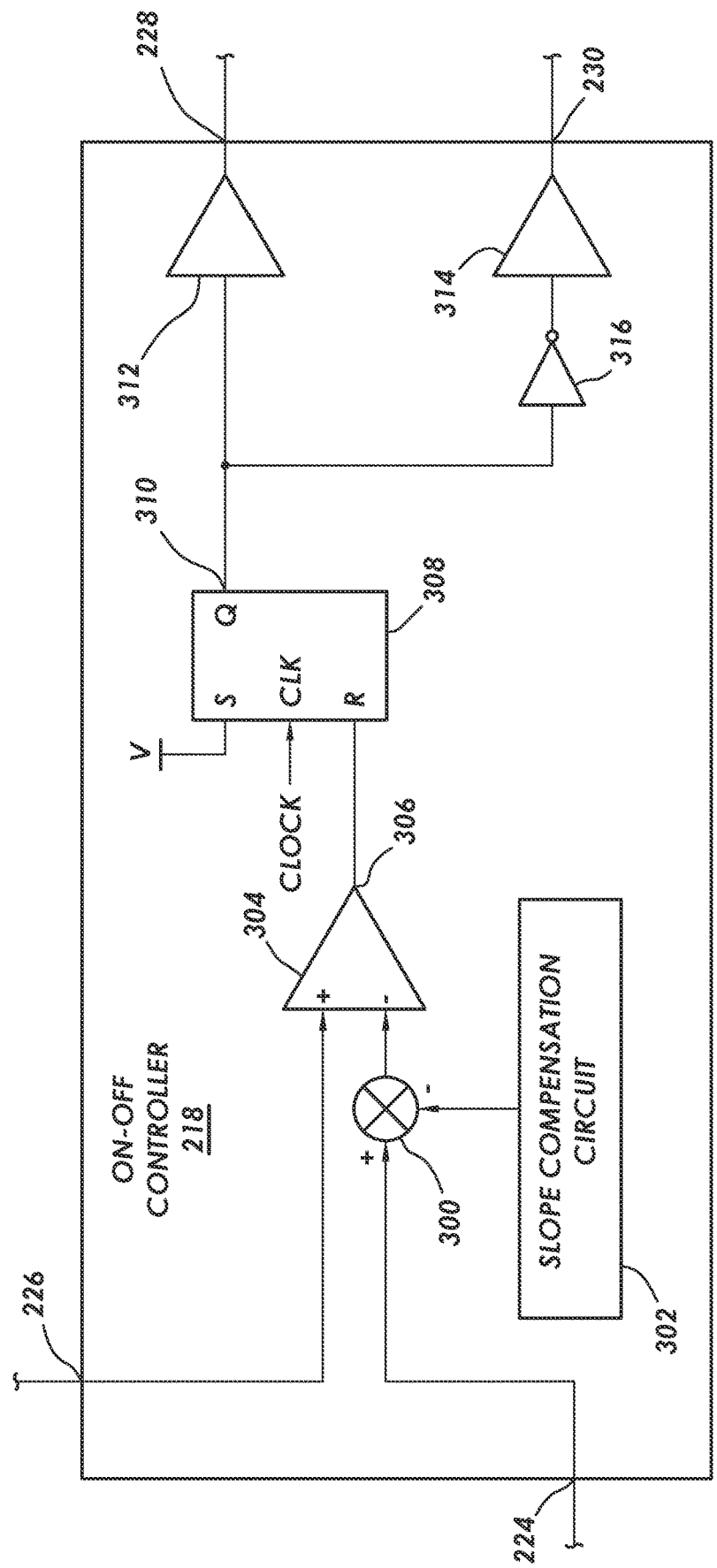
FIG. 3 shows a schematic of an on-off controller in accordance with at least some embodiments.

FIG. 3 shows a schematic of an example on-off controller 218. In particular, visible in FIG. 3 are the peak-current input 224 that receives a peak-current signal, the current-sense input 226, the high-drive output 228, and the low-drive output 230. Internally, the peak-current input 224 is coupled to a first input of a summation block 300. The second input of the summation block 300 is coupled a slope compensation circuit 302. The example slope compensation circuit 302 is designed and constructed to create a slope compensation signal supplied to the second input of the summation block 300. The example summation block 300 subtracts the slope compensation signal from the peak-current signal to create a resultant referred to as a compensated signal, and drives the compensated signal to an output. The slope compensation signal created by the slope compensation circuit 302 reduces or eliminates subharmonic distortion that tends to be present when the duty cycle of the SMPS operation reaches or exceeds 50%.

The example on-off controller 218 further comprises a comparator 304 defining a non-inverting input coupled to the current-sense input 226, a inverting coupled to the compensation signal that emerges from the summation block 300, and a reset output 306. The comparator 304 thus compares a signal indicative of current received on the current-sense input 226 to the compensation signal applied to the inverting input, and asserts the reset output 306 when the signal indicative of current crosses the compensation signal (e.g., when the current through the high-side FET and inductor reach peak-current setpoint represented by the compensated signal).

Still referring to FIG. 3, the example on-off controller 218 further includes an SR latch 308 that defines a set input coupled to an asserted signal (e.g., voltage on a power rail), a reset input coupled to the reset output 306 of the comparator 304, a clock input (CLK) coupled to a fixed-frequency clock signal, and a latch output 310. In the example system, the fixed-frequency clock signal applied to the clock input CLK controls the start time of each charge mode. That is, with the set input held high, each assertion of the clock input CLK (e.g. each rising edge) asserts the latch output 310. The latch output 310 remains asserted until the reset input is asserted by the comparator 304. Stated otherwise, the latch output 310 remains asserted until the current through the high-side FET, the inductor, and the LEDs reaches a peak-current setpoint represented by the compensated signal. The latch output 310 remains de-asserted until the next assertion of the clock signal applied to the clock input CLK. Putting aside the slope compensation for a moment, the signal supplied to the peak-current input 224 can be considered a peak-current setpoint supplied from upstream devices. As a precursor to the discussion that follows, when the driver circuit 106 is operating in closed-loop mode, the signal applied to the peak-current input 224 is referred to as a peak-current signal. And when the driver circuit 106 is operating in open-loop mode, the signal applied to the peak-current input 224 is referred to as a zenith-current signal. Operation of the on-off controller 218 is the same as between receiving the peak-current signal and the zenith-current signal, but different wording is used to textually differentiate the two operating modes.

The example on-off controller 218 further comprises a gate driver amplifier 312 having a drive input coupled to the latch output 310, and a drive output defining the high-drive output 228. The gate driver amplifier 312 is designed and constructed to, responsive to assertion of the latch output 310, drive a current and a voltage to the gate of the high-side FET sufficient to make the high-side FET fully conductive. Similarly, the example on-off controller 218 comprises a gate driver amplifier 314 having a drive input coupled to the latch output 310 by way of a NOT gate 316, and a drive output coupled to and defining the low-drive output 230. The gate driver amplifier 314 is likewise designed and constructed to, responsive to de-assertion of the latch output 310, drive a current and a voltage to the gate of the low-side FET sufficient to make the high-side FET fully conductive.

Returning to FIG. 2, the example driver circuit 106 further comprises a multiplexer 234 defining a closed-loop input 236, an open-loop input 238, a select input 240, and a select output 242 coupled to the peak-current input 224 of the on-off controller 218. Depending on the state of the select input 240, the example multiplexer may couple either a peak-current signal on the closed-loop input 236 to the peak-current input 224, or a zenith-current signal on the open-loop input 238 to the peak-current input 224. For example, when the select input 240 is asserted, the multiplexer 234 may couple the peak-current signal on the closed-loop input 236 to the peak-current input 224, and when the select input 240 is de-asserted the multiplexer 234 may couple the zenith-current signal on the open-loop input 238 to the peak-current input 224.

The example closed-loop regulator 220 defines a setpoint input 250 coupled to the setpoint terminal 122, a switch-node input 252 coupled to the switch-node terminal 114 (as shown by the bubble "A"), a high-sense input 254 coupled to the drain 206 of the high-side FET 202, a mode input 256 coupled to the high-drive output 228 (as shown by bubble "B"), a peak-current output 258 coupled to the closed-loop input 236 of the multiplexer 234, and a select output 260 coupled to the select input 240 of the multiplexer 234.

The closed-loop regulator 220 creates and/or receives a signal indicative of the average-current setpoint by way of the setpoint input 250. The example closed-loop regulator 220 is designed and constructed to create a feedback signal indicative of the average current through the inductor, and regulate the current based on the feedback signal and the average-current setpoint. In the example shown, the feedback signal indicative of the average current through the inductor is created by sampling a voltage across the high-side FET 202 during charge modes, the sampling by way of the switch-node input 252 and the high-sense input 254. In particular, at the instant in time at which the average current should be flowing through high-side FET 202 during each charge mode, the closed-loop regulator 220 samples or measures the voltage across the high-side FET 202, and then takes a closed-loop control action to modify operation of the driver circuit 106 if the feedback signal indicates the actual average current is higher or lower than the average-current setpoint. Sampling the voltage across the high-side FET 202 during each charge mode as the mechanism to create the feedback signal indicative of the average current is merely an example. Alternatively, the closed-loop regulator 220 may sample using the current sensor 232 during each charge mode to create the feedback signal, or the closed-loop regulator 220 may sample during each discharge mode by measuring the voltage across the low-side FET 204 to create the feedback signal. In yet still further cases, the closed-loop regulator 220 may receive a signal from outside the driver 106 (e.g., from a low resistance resistor in series with the inductor).

Still referring to FIG. 2, the example closed-loop regulator 220 is designed and constructed to drive a peak-current signal to the peak-current output 258 and thus the closed-loop input 236, the peak-current signal created based on the feedback signal indicative of the average current and the average-current setpoint. When the average current is low, the closed-loop regulator 220 increases the magnitude of the peak-current signal, and when the average current is high the closed-loop regulator 220 decreases the magnitude of the peak-current signal. Assuming for the now that the select output 260 is asserted, the peak-current signal created and driven by the closed-loop regulator 220 is supplied to the peak-current input 224 of the on-off controller 218, and thus the on-off controller 218 controls the peak current in each charge mode based on the peak current signal supplied by the closed-loop regulator.

Figure 4:
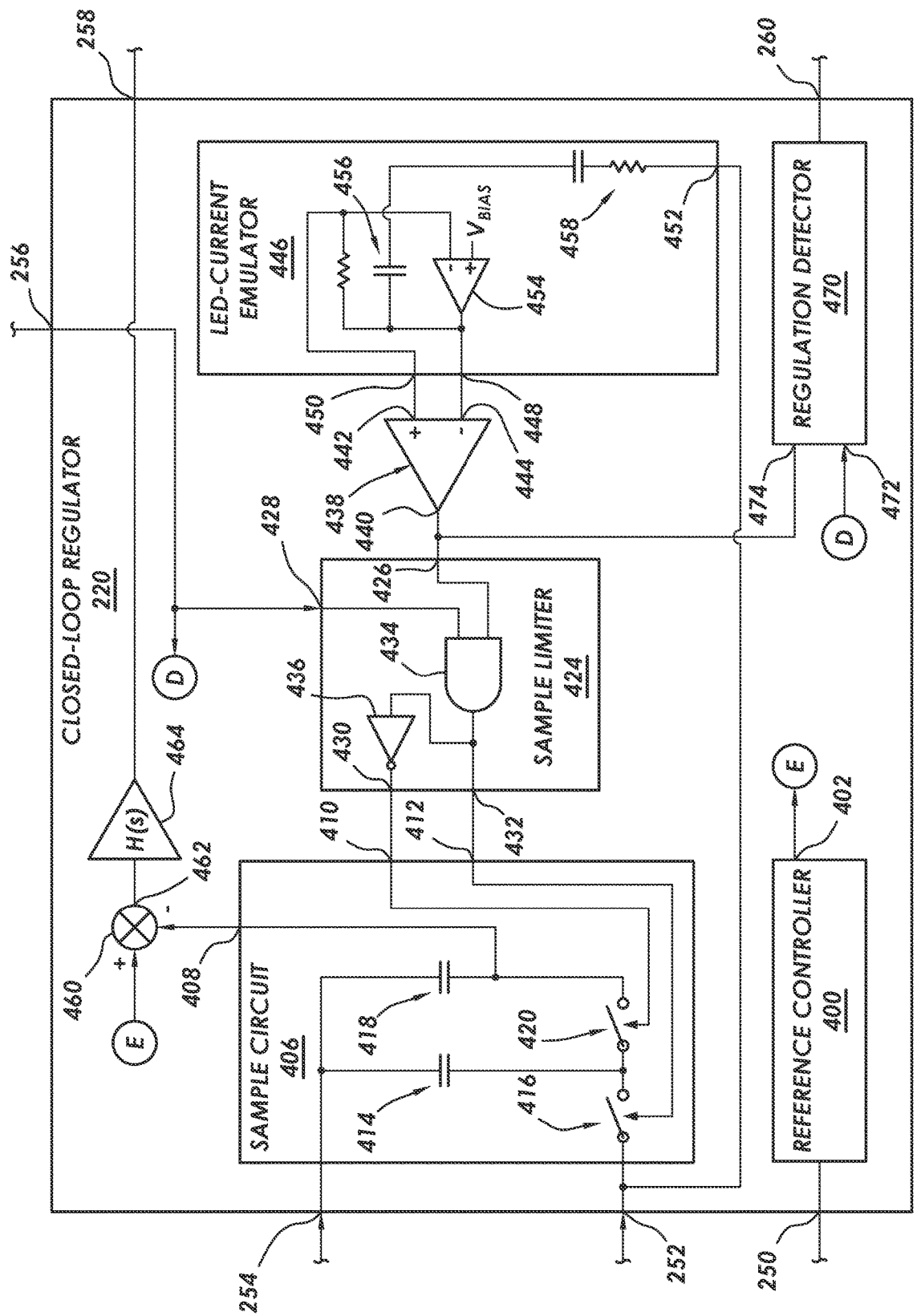
FIG. 4 shows a partial block diagram, partial electrical schematic, of a closed-loop regulator in accordance with at least some embodiments.

FIG. 4 shows a partial block diagram, partial electrical schematic, of an example closed-loop regulator 220. Visible in FIG. 4 are the setpoint input 250, the switch-node input 252, the high-sense input 254, the mode input 256, the peak-current output 258, and the select output 260. Internally, the example closed-loop regulator 220 may be conceptually, though not necessarily physically, divided into a reference controller 400, a sample circuit 406, a sample limiter 424, an LED-current emulator 446, a regulation detector 470, and an amplifier system 464. Each will be addressed in turn.

The example reference controller 400 defines the setpoint input 250 and a setpoint output 402. In example systems, the reference controller 400 is designed and constructed to interface with the resistor 126 (FIG. 1), and drive a setpoint signal to the setpoint output 402. In particular, the example reference controller 400 samples voltage across the resistor 126 or a current through the resistor 126, and using the sample creates a signal indicative of the average-current setpoint. The reference controller provides the signal indicative of the average-current setpoint to other circuits within the closed-loop regulator 220, as shown by bubble "E".

The example closed-loop regulator 220 further comprises the sample circuit 406. The example sample circuit 406 is coupled to the switch-node input 252 (and thus the switch-node terminal 114) and the high-sense input 254 (and thus the input-voltage terminal 112). The example sample circuit 406 further defines a sense output 408, a hold input 410, and a sample input 412. The sample circuit 406 is designed and constructed to measure a drain-to-source voltage of a power transistor (e.g., the high-side FET or the low-side FET). The example closed-loop regulator 220 is designed and constructed to measure the drain-to-source voltage of the high-side FET 202 during the charge mode of the inductor to create the feedback signal indicative of average current through the inductor, and provide the feedback signal to other components of the closed-loop regulator 220.

Internally, the sample circuit 406 comprises a sample capacitor 414 having a first lead coupled to the high-sense input 254 and a second lead. An electrically-controlled switch (hereafter switch 416) has a first connection coupled to the switch-node input 252, a second connection coupled to the second lead of the sample capacitor 414, and a control input coupled to the sample input 412. The sample circuit 406 further comprises a hold capacitor 418 having a first lead coupled to the high-sense input 254 and a second lead coupled to the sense output 408. An electrically-controlled switch (hereafter switch 420) has a first connection coupled to the second lead of the sample capacitor 414, a second connection, and a control input coupled to the hold input 410.

In order to take a sample, the sample input 412 is asserted and the hold input 410 is de-asserted, the switch 416 is closed or conductive and the switch 420 is open or non-conductive. Thus, in the example arrangement, the drain-to-source voltage of high-side FET 202 is sampled by the sample capacitor 414. At other times, the sample input 412 is de-asserted and the hold input 410 is asserted, the switch 416 is open or non-conductive, and the switch 420 is closed or conductive. Thus, during hold times the drain-to-source voltage sampled by the sample capacitor 414 is transferred to the hold capacitor 418. It follows that at all times there is a sampled drain-to-source voltage applied to the sense output 408, and in example cases the drain-to-source voltage is sampled once each switching period.

Still referring to FIG. 4, the closed-loop regulator 220 further comprises the sample limiter 424. The sample limiter 424 defines a sample input 426, a timing input 428, a hold output 430 coupled to the hold input 410, and a sample output 432 coupled to the sample input 412. The sample limiter 424 is designed and constructed to assert the sample output 432 once in each switching period of the driver circuit 106. More particularly, the sample input 426 may be asserted twice in each switching period: once during the charge mode when an emulated LED current (discussed more below) crosses an average value; and once during the discharge mode when the emulated LED current again crosses the average value. Responsive to assertion of the sample input 426, the sample limiter 424 asserts the sample output 432 (and de-asserts the hold output 430) only once during the switching period. In cases in which the timing input 428 is coupled to the gate of the high-side FET 202 (as implied in FIG. 4), the sample limiter 424 asserts the sample output 432 (and de-asserts the hold output 430) during the charge mode at the instant in time when the emulated LED current rises through the average value, and ending at the end of the charge mode.

FIG. 4 shows example logic gates to implement the functionality of the sample limiter 424. In particular, the sample limiter 424 further comprises an AND gate 434 defining a first input coupled to the timing input 428, a second input coupled to the sample input 426, and a gate output coupled to and defining the sample output 432. The example sample limiter 424 further comprises a NOT gate 436 defining an input coupled to the sample output 432, and an inverted output coupled to and defining the hold output 430.

Still referring to FIG. 4, the example closed-loop regulator 220 further comprises the comparator 438 that defines a compare output 440 coupled to the sample input 426, a non-inverting input 442, and an inverting input 444. As discussed in greater detail below, an emulated LED current in the form of a sawtooth waveform is provide to the inverting input 444 of the comparator 438, and a signal indicative of an average value of the sawtooth waveform is provided to the non-inverting input 442. It follows that the compare output 440 changes state when the sawtooth waveform crosses the signal indicative of the average value.

The driver circuit 106 further comprises the LED-current emulator 446. The LED-current emulator 446 defines an emulator output 448 and the average output 450. The example LED-current emulator 446 also defines a switch-node input 452 coupled to the switch-node input 252 and thus the switch-node terminal 114. The LED-current emulator 446 is designed and constructed to integrate a voltage on the switch-node terminal and to drive, to the emulator output 448, a sawtooth waveform having an average value. More particularly, the voltage at the switch-node terminal 114 cycles between the input voltage VIN (during the charge mode) and the ground reference (during the discharge mode). However, the current through the inductor 108 is proportional to the amount of time the input voltage VIN is coupled to the inductor 108 during the charge mode, and further proportional to the amount of time the ground reference is coupled to the inductor 108 during the discharge mode. The example LED-current emulator 446 creates an emulated inductor current signal by integrating over time the voltage on the switch-node terminal 114. The integration results in the sawtooth waveform having an average value. The example LED-current emulator 446 provides the sawtooth waveform to the emulator output 448, and provides the average value of the sawtooth waveform to the average output 450. So long as the peak values of the sawtooth waveform are within the operating range of the comparator 438, the actual peak values may be selected at the discretion of the circuit designer. Similarly, so long as the voltage indicative of the average value is within the operating range of the comparator 438, the voltage used to be indicative of the average value again may be selected at the discretion of the circuit designer.

The LED-current emulator 446 works with the comparator 438 to delineate the point in time when the sawtooth waveform crosses the voltage indicative of the average value. In steady-state operation of the LED module 104 driving the LEDs 110 (FIG. 1), the point in time when the sawtooth waveform crosses the voltage indicative of the average value corresponds to the current through the inductor 108 and LEDs 110 crossing the setpoint-average current. If the actual current through the inductor 108 and LEDs 110 is higher or lower than the setpoint-average current, then the closed-loop regulator 220 takes control action (e.g., increasing the on-time or decreasing the on-time).

Still referring to FIG. 4, the example LED-current emulator 446 comprises an operational amplifier 454 configured for integration, as shown by the capacitor 456 coupled between the inverting input and the integrated output of the operational amplifier 454. In particular, the voltage of the switch-node terminal 114 (applied through the switch-node input 452) is coupled to the inverting input of the operational amplifier 454 by way of a filter network 458. The voltage at the switch-node input 452 may be optionally scaled down by a voltage divider (not specifically shown). The integrated output of the operational amplifier 454 is coupled to and defines the emulator output 448. The non-inverting input of the operational amplifier 454 is coupled to a bias voltage $V_{BIAS}$. So long as bias voltage $V_{BIAS}$ is within the operation range of the operational amplifier 454, the voltage may be selected at the discretion of the circuit designer. It turns out that the bias voltage $V_{BIAS}$ will be the average value of the integration performed by the operational amplifier 454. Thus, in the example embodiment shown the inverting input of the operational amplifier 454 (which very closes matches the bias voltage $V_{BIAS}$) is coupled to the average output 450 to be provided to the comparator 438.

Returning briefly to the comparator 438, the comparator 438 is provided, by way of the emulator output 448, the sawtooth waveform created by the operational amplifier 454. The comparator 438 is also provided, by way of the average output 450, a voltage indicative of the average value of the sawtooth waveform. As described above, the compare output 440 thus changes state each time the sawtooth waveform applied to the inverting input 444 crosses the voltage indicative the average value applied to the non-inverting input 442.

Still referring to FIG. 4, the example closed-loop regulator 220 further comprises a summer 460 defining a first input coupled to the setpoint output 402 of the reference controller 400, a second input coupled to the sense output 408 of the sample circuit 406, and an error output 462. The summer 460 receives a setpoint signal from the reference controller 400, and as indicated in the figure the summer 460 subtracts therefrom the feedback signal indicative of average current to produce an error signal on the error output 462. If the feedback signal is different than the setpoint signal, a non-zero error voltage is produced on the error output 462 of the summer 460.

The error signal driven to the error output 462 of the summer 460 is coupled to an amplifier system 464, and an output of the amplifier system 464 defines the peak-current output 258. In example cases, the amplifier system 464 implements a transfer function H(S), such as a proportional-integral-differential (PID) control (e.g., a Type III Compensation Network) using the error signal supplied from the summation block 460. A control signal generated by the amplifier system 464 is thus the peak-current signal driven to the peak-current output 258. The peak-current signal is proportional to a peak current to be reached in each charge mode.

Figure 5:
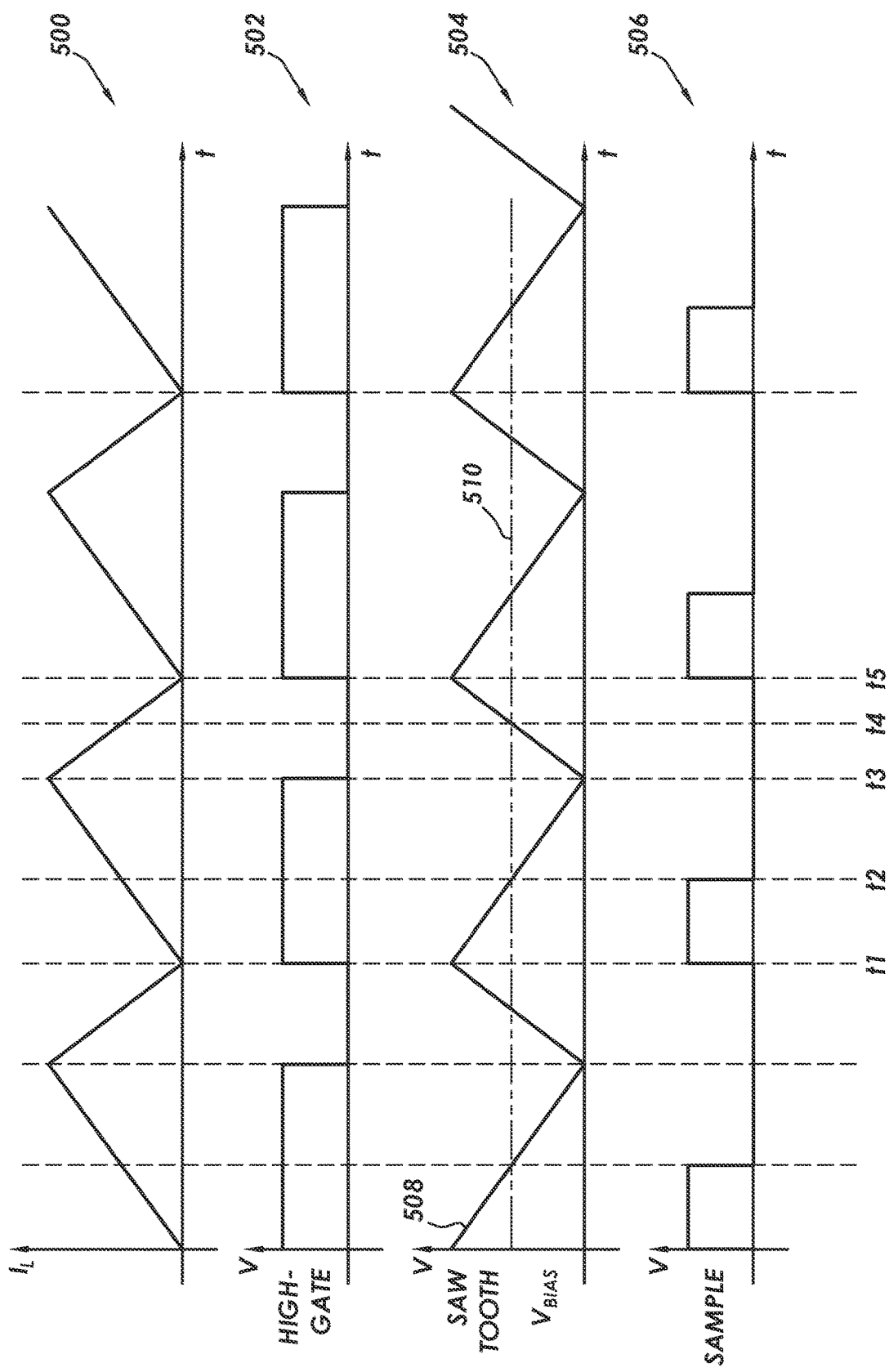
FIG. 5 shows a timing diagram in accordance with at least some embodiments.

FIG. 5 shows a timing diagram in accordance with at least some embodiments. In particular: plot 500 shows inductor current $I_L$ as a function time; plot 502 shows the voltage applied to the control input of the high-side FET as a function of time; plot 504 shows a sawtooth waveform as a function of time, and a co-plotted bias voltage $V_{BIAS}$; and plot 506 shows a sample signal applied to the sample circuit 406 as a function of time. The plots are along corresponding time axes.

FIG. 5 shows three complete switching periods and one partial switching period for the example LED module 104 (FIG. 1). For example, FIG. 5 shows an example charge mode between times t1 and t3, and an example discharge mode between times t3 and t5. During the charge mode, the inductor current inductor current $I_L$ rises from a low value to a peak value (e.g., the peak value controlled by the on-off controller 218). During the discharge mode current falls from the peak value until the next charge mode begins. Stated otherwise, the time period between times t1 and t3 is an example on-time or charge mode, and the time period between times t3 and t5 is an example off-time or discharge mode.

Plot 502 shows an example signal provided to the gate 210 of the high-side FET 202. The gate 216 of the low-side FET 204 receives a signal that is a logical NOT of the signal of plot 502 (see, e.g., the NOT gate 316 of FIG. 3). Thus, the example signal is shown asserted (e.g., asserted high) between times t1 and t3, and de-asserted between times t3 and t5. During times when the gate 210 of the high-side FET 202 is asserted, the high-side FET 202 is conductive. During times when the gate 210 of the high-side FET 202 is de-asserted, the high-side FET 202 is non-conductive.

Plot 504 shows an example sawtooth waveform 508 created by the LED-current emulator 446. For convenience of the circuit design, the magnitude of the sawtooth waveform 508 is a mirror image of the magnitude of the inductor current $I_L$, but with the benefit of this disclosure one of ordinary skill could create a sawtooth waveform with polarity that matches the inductor current $I_L$. As mentioned above, however, the points or instants in time when the sawtooth waveform 508 crosses the average value define the trigger to sample the drain-to-source voltage of one of the power transistors. Co-plotted with the sawtooth waveform 508 is the bias voltage $V_{BIAS}$ 510 that represents the average value with respect to the sawtooth waveform 508. Considering the switching period between times t1 and t5, the sawtooth waveform 508 crosses (e.g., falls below) the bias voltage $V_{BIAS}$ 510 at time t2, and the sawtooth waveform 508 again crosses (e.g., rises above) the bias voltage $V_{BIAS}$ 510 at time t4.

Plot 506 shows an example sample signal as applied to the sample input 412 of the sample circuit 406. The hold input 410 of the sample circuit 406 receives a hold signal that is a logical NOT of the sample signal (see, e.g., NOT gate 436). Thus, in examples in which the drain-to-source voltage of the high-side FET 202 is sampled as part of the control methodology, the sample signal is asserted (e.g., asserted high) between times t1 and t2. At time t2, the example sample signal is de-asserted (and the hold signal is asserted), and thus the sample circuit 406 holds the sampled drain-to-source voltage across hold capacitor 418. In another example, the sample circuit 406 may be designed and constructed to sample the drain-to-source voltage of the low-side FET 204. In such alternate arrangements, the sample signal would be designed and constructed to be asserted between times t3 and t4, such that the sampled drain-to-source voltage at the state transition at time t4 becomes the feedback signal applied to the summation block 460.

Returning to FIG. 4, the example closed-loop regulator 220 further comprises the regulation detector 470. The example regulation detector 470 is designed and constructed to monitor operation of the closed-loop regulator 220, and assert the select output 260 when the closed-loop regulator 220 achieves sufficient regulation to be in control of supplying the peak-current signal to the on-off controller 218 (FIG. 2). Stated differently, the example regulation detector 470 detects when the closed-loop regulator 220 has stabilized, and asserts the select output 260 upon stabilization. Oppositely, the regulation detector 470 is designed and constructed to de-assert the select output 260 when the closed-loop regulator 220 is out of sufficient regulation. It will be understood that the example closed-loop regulator 220 has the capability to send a peak-current signal to the on-off controller 218 at all times; however, in example cases the closed-loop regulator 220 is tuned for static operation (e.g., not in startup or when fast transient response is needed) and the LED module 104 has a stable load (e.g., all LEDs 110 in operation).

Being tuned for operation in non-transient conditions and for stable load, the responsiveness of the closed-loop regulator 220 to large input voltage swings and/or step changes in load may be relatively slow. For example, when an automobile's starter is cranking the engine, the battery voltage may fall below 10V, and in some cases around 4-5V, and then return to about 12V when cranking ceases. While the closed-loop regulator 220 would eventually bring the average LED current back to the average-current setpoint, the closed-loop regulator 220 may take a significant amount of time to return the average current to the average-current setpoint (e.g., 2-3 milliseconds (ms)) after such an input voltage excursion. As another example, for various reasons the ECU 102 may command the LED module 104 to bypass one or more LEDs in the group of LEDs 110 (e.g., when switch 134 (FIG. 1) is made conductive). Again, while the closed-loop regulator 220 would eventually bring the average LED current back to the average-current setpoint after the one or more LEDs are bypassed, the closed-loop regulator 220 may take a significant amount of time to return the average current to the average-current setpoint (e.g., again 2-3 ms). In order address the slow response issues, various examples use the open-loop regulator 222 during such times, and the example regulation detector 470 makes the determinations as to when the peak-current signal should be supplied to the on-off controller 218, and when the zenith-current signal should be supplied to the on-off controller 218.

The example regulation detector 470 makes its determination by monitoring the relationship between the sawtooth waveform and the average value. For example cases of sampling the voltage across the high-side FET during the charge mode, if the emulated sawtooth waveform fails to cross the average value within the charge mode, such is an indication that the closed-loop regulator 220 is out of regulation, and thus the regulation detector 470 de-asserts the select output 260. To that end, the example regulation detector 470 defines a mode input 472 coupled to the mode input 256 (as shown by bubble "D"), and a compare input 474 coupled to the compare output 440 of the comparator 438. If the compare output 440 is asserted during the charge mode when the mode input 472 is asserted, the regulation detector 470 asserts or maintains the assertion of the select output 260. If the compare output 440 fails to become asserted during the charge mode when the mode input is asserted, the regulation detector de-asserts to select output 260. Stated otherwise, the regulation detector 470 drives a regulation signal to the select output 260.

Returning to FIG. 2, the multiplexer 234 selects between supplying the peak-current signal from the closed-loop regulator 220 to the on-off controller 218 or the zenith-current signal from the open-loop regulator 222 to the on-off controller 218, the selection based on the select signal driven to the select input 240 by the closed-loop regulator 220 (and specifically the regulation detector 470). The specification now turns to the example open-loop regulator 222 in greater detail.

The example open-loop regulator 222 creates a zenith-current signal that is sometimes supplied to the on-off controller 218 through the multiplexer 234. In one example, the open-loop regulator 222 calculates the zenith-current signal for each charge mode without using a feedback signal indicative of current through the LEDs 110. In another example, the example open-loop regulator 222 calculates the zenith-current signal based on the average-current setpoint, a voltage on the switch-node terminal 114 (and thus the switch node), and an indication of the inductance of the inductor 108. In yet another example, the open-loop regulator 222 calculates the zenith-current signal based on the average-current setpoint, a peak increment indicative of a difference between the average-current setpoint and a zenith current, and a compensation increment indicative of the slope compensation implemented within the on-off controller 218.

It follows that the example open-loop regulator 222 is so named because, as the immediately previous paragraph indicates, the zenith-current signal created by the open-loop regulator 222 is derived in an open-loop sense without using a feedback signal indicative of actual current flowing through the inductor 108 and LEDs 110. Operation of the example open-loop regulator 222 is based on the principle that the zenith current for each charge mode can be estimated mathematically, such that the current through the inductor 108 and LEDs 110 is close to or about the average-current setpoint.

The example open-loop regulator 222 calculates a zenith current for each charge mode by implementing circuitry and/or instructions that implement following equations:

$$Z = (R_f x I_{SET}) + \left(\frac{1-D}{2} x T_{SW} x M\right) + (D x T_{SW} x M) \quad (1)$$

$$M = R_f x \frac{V_{OUT}}{L} \quad (2)$$

where Z is the zenith current, $R_f$ is a scaling factor, $I_{SET}$ is the average-current setpoint, D is the duty cycle expressed as a value between zero and one, $T_{SW}$ is the switching period, M is slope factor related to the slope of the inductor current and defined by Equation (2), $V_{OUT}$ is the output voltage at the switch node, and L is the inductance of the inductor 108. The three parenthetical components of the Equation (1) may be conceptually described as, working from left to right: a scaled version of the average-current setpoint; a peak increment indicative of a difference between the average-current setpoint and an expected zenith current; and a compensation increment indicative of the slope compensation.

Figure 6:
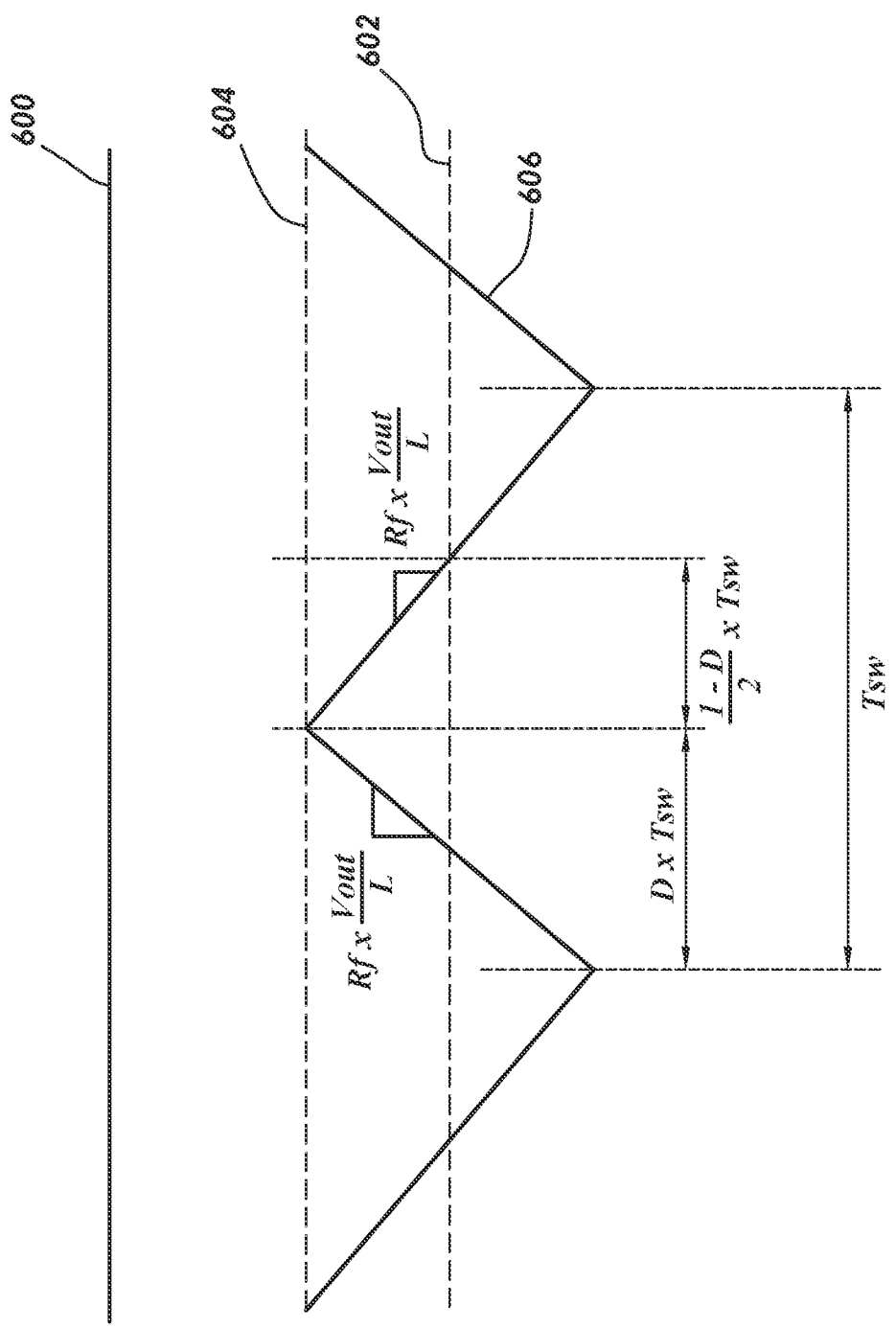
FIG. 6 shows a series of waveforms to visually explain the parenthetical components of Equation (1), and in accordance with at least some embodiments.

FIG. 6 shows a series of waveforms to visually explain the parenthetical components of Equation (1). In particular, the upper line shows an example zenith-current value or zenith-current signal 600, the lower horizontal line shows an example scaled average-current setpoint 602, the middle horizontal line shows the resultant of the scaled average-current setpoint 602 summed with a peak increment to account for peak current control (the combination referred to as the peak-adjusted signal 604), and superimposed to show timing and slope relationships is the sawtooth waveform 606. The zenith-current signal 600 thus has a first component being the scaled version of the average-current setpoint 602 (i.e., the first parenthetical of Equation (1)).

As alluded to above, the inductor current rises above the average-current setpoint during charge modes, and falls below the average-current setpoint during discharge modes. During open-loop regulation, to achieve the average-current setpoint the zenith current needs to be above the average-current setpoint. The zenith-current signal 600 thus includes a peak increment (i.e., the middle parenthetical) added to account for peak current control by the on-off controller 218. In example cases, the peak increment is calculated based on the slope of the rising inductor current $I_L$ and a time factor. That is, the slope of the inductor current may be estimated (e.g., the M of Equation (2)), and the estimated slope is multiplied by a time factor corresponding to half the duration of the charge mode to arrive at the peak increment. The peak increment is added to the scaled average-current setpoint 602 to arrive at the peak-adjusted signal 604. In FIG. 6, the sawtooth waveform 606 is shown, and in the example implementation the sawtooth waveform 606 has an opposite polarity to that of the inductor current, hence the reason the slope for the peak increment is shown on the falling side of the sawtooth waveform 606.

In example cases the zenith-current signal 600 also comprises a component to account for or offset the slope compensation (i.e., the third parenthetical). In example cases the slope compensation used by the on-off controller 218 is based on the slope of the falling inductor current $I_L$. Thus, the example open-loop regulator 222 adds a compensation increment (i.e., third parenthetical) to offset slope compensation applied at the on-off controller 218. The compensation increment is likewise based on the slope of the inductor current $I_L$ (e.g., M from Equation (2)) multiplied by a time factor corresponding to duration of the discharge mode. The compensation incremented added to arrive at the zenith-current signal 600 thus compensates or offsets the slope compensation signal subtracted by the on-off controller 218 by way of the summation block 300 (FIG. 3). Again in FIG. 6, the sawtooth waveform 606 is shown, and the example sawtooth waveform 606 has an opposite polarity to that of the inductor current, hence the reason the slope for the compensation increment is shown on the rising side of the sawtooth waveform 606.

Returning briefly to FIG. 2, in example cases the open-loop regulator 222 defines a sense input 270 coupled to the indicator terminal 120 and thus the resistor 128, a setpoint input 272 coupled to the setpoint terminal 122 and thus the resistor 126, a zenith-current output 274 coupled to the open-loop input 238, a switch-node input 276 coupled to the switch-node terminal 114 (as shown by bubble "C"), and a mode input 278 coupled to the high-drive output 228 (as shown by bubble "B"). The example open-loop regulator 222 derives a value indicative of the inductance by way of the resistor 128 through the sense input 270. The example open-loop regulator 222 derives the average-current setpoint by way of the resistor 126 and the setpoint input 272. The example open-loop regulator 222 senses a signal indicative of output voltage by way of the switch-node input 276. The example open-loop regulator 222 derives duty cycle information by way of the mode input 278. Calculating the zenith-current signal driven to the zenith-current output 274 may take place by way of instructions executed in some form of a processor, may take place in an analog format using individual circuit components, or may take place in a combination of elements. What follows is an example analog implementation.

Figure 7:
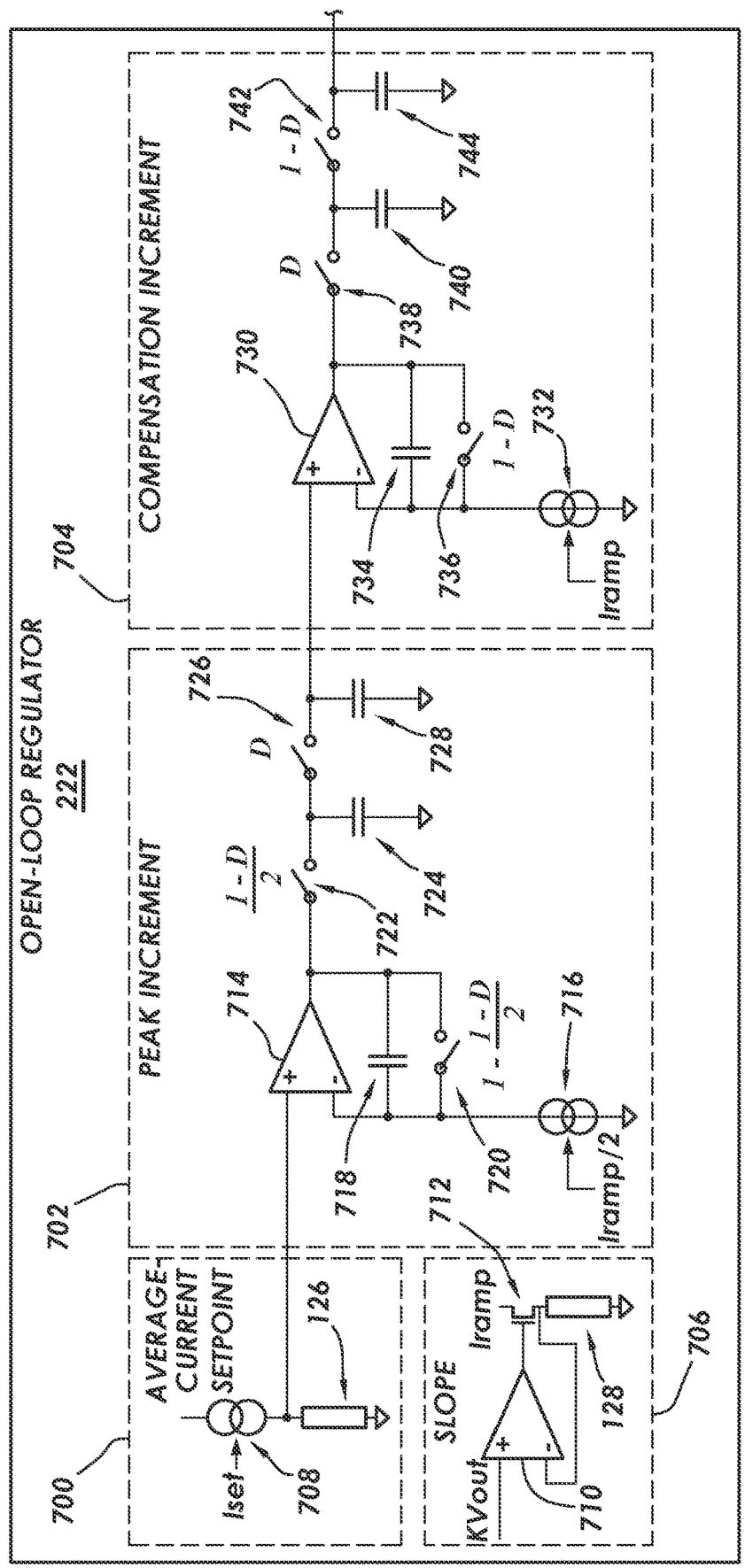
FIG. 7 shows an electrical schematic of an open-loop regulator in accordance with at least some embodiments.

FIG. 7 shows an electrical schematic of an example open-loop regulator 222. FIG. 7 is organized to correspond to the parentheticals of Equation (1), and Equation (2). Thus, the example open-loop regulator 222 defines a first-parenthetical circuit 700, a second-parenthetical circuit 702, a third parenthetical circuit 704, and a slope circuit 706. Each will be addressed in turn.

The example first-parenthetical circuit 700 comprises a current source 708 coupled to the resistor 126 (illustratively shown within the circuit, but actually residing outside the driver circuit 106 as shown by FIG. 2). The current source 708 thus drives a known current through the resistor 126, and the voltage developed across the resistor 126 is a signal indicative of the average-current setpoint. In other words, the first-parenthetical circuit 700 produces a signal representative of the value of first parenthetical of Equation (1). This value is a signal indicative of the average-current setpoint.

The example slope circuit 706 is designed and constructed to create a signal indicative of the slope of the inductor current. In particular, the example slope circuit 706 comprises an operational amplifier 710 having a non-inverting input coupled to scaled version of the output voltage $KV_{OUT}$. In example cases, the scaled version of the output voltage $KV_{OUT}$ may be the voltage on the switch node as sampled through a voltage divider. The inverting input of the operational amplifier 710 is coupled to the resistor 128 (illustratively shown within the circuit, but actually residing outside the driver circuit 106 as shown by FIG. 2). The output of the operational amplifier 710 is coupled to the gate of a transistor 712 (illustratively shown as a FET). The drain of the transistor 712 is coupled to a rail voltage, and the source of the transistor is coupled to the non-inverting input and the resistor 128. The operational amplifier 710 drives the output and thus the transistor 712 in an attempt to make the voltage on the inverting input substantially match the non-inverting input (i.e., the scaled voltage of the voltage on the switch node). The result is a current signal $I_{RAMP}$ proportional to the KVOUT and the inductance (e.g., slope of the inductor current). The current signal $I_{RAMP}$, being proportional to the slope of the inductor current, is used by both the second-parenthetical circuit 702 and the third-parenthetical circuit 704, as indicated by the "$I_{RAMP}$" in each of those circuits.

Still referring to FIG. 7, the example open-loop regulator 222 further comprises the second-parenthetical circuit 702. The second-parenthetical circuit 702 is designed and constructed to calculate the peak increment and add the peak increment to the average-current setpoint. In particular, the example second-parenthetical circuit 702 comprise an operational amplifier 714 defining a non-inverting input coupled to the signal indicative of the average-current setpoint generated by the first-parenthetical circuit 700. The operational amplifier 714 further defines an inverting input coupled to a first lead of a current source 716, and the current source 716 defines a control input coupled to a value being half the current signal $I_{RAMP}$. Between the output of the operational amplifier 714 and the inverting input resides a capacitor 718 and an electrically-controlled switch (hereafter switch 720) coupled in parallel with the capacitor 718. In example cases, the switch 720 is made conductive during each period $T_{SW}$ for a duration proportional to (1−(1−D)/2) where D is the duty cycle as defined above.

The output of the operational amplifier 714 is coupled to a first lead of an electrically-controlled switch (hereafter just switch 722), and the second lead of the switch 722 is coupled to a capacitor 724. In example cases, the switch 722 is made conductive during each period $T_{SW}$ for a duration proportional to (1−D)/2) where again D is the duty cycle. The second lead of the switch 722 is further coupled to a first lead of an electrically-controlled switch (hereafter just switch 726), and the second lead of the switch 726 is coupled to a capacitor 728. In example cases, the switch 726 is made conductive during each period $T_{SW}$ of the driver circuit 106 for a duration proportional to D. What resides on the capacitor 728 each time the switch 726 is made non-conductive is the signal proportional to the sum of the average-current setpoint and the peak increment.

The example third-parenthetical circuit 704 is designed and constructed to add the compensation increment to the sum of the scaled average-current setpoint and the peak increment received from the second-parenthetical circuit 702. In particular, the example third-parenthetical circuit 704 includes an operational amplifier 730 defining a non-inverting input coupled to the signal proportional to the sum of the scaled average-current setpoint and the peak increment generated by the second-parenthetical circuit 702. The operational amplifier 730 further defines an inverting input coupled to a first lead of a current source 732, and the current source 732 defines a control input coupled to a value being the current signal $I_{RAMP}$. Between the output of the operational amplifier 730 and the inverting input resides a capacitor 734 and an electrically-controlled switch (hereafter just switch 736) coupled in parallel with the capacitor 734. In example cases, the switch 736 is made conductive during each period $T_{SW}$ of the driver circuit 106 for a duration proportional to (1−D).

The output of the operational amplifier 730 is coupled to a first lead of an electrically-controlled switch (hereafter just switch 738), and the second lead of the switch 738 is coupled to a capacitor 740. In example cases, the switch 738 is made conductive during each period $T_{SW}$ of the driver circuit 106 for a duration proportional to D. The second lead of the switch 738 is further coupled to a first lead of an electrically-controlled switch (hereafter just switch 742), and the second lead of the switch 742 is coupled to a capacitor 744. In example cases, the switch 742 is made conductive during each period $T_{SW}$ of the driver circuit 106 for a duration proportional to D. What resides on the capacitor 744 each time the switch 742 is made non-conductive is the zenith-current signal.

The open-loop regulator 222 of FIG. 7 is shown implemented as a purely analog circuit; however, one having ordinary skill, and now understanding the functioning of the open-loop regulator 222, could design many alternative circuits to create the zenith-current signal, including other analog circuits, instructions execute on a processor to perform the calculations digitally, and mixed analog/instruction systems. Thus, the example purely analog implementation of FIG. 7 should be viewed as a limitation as to the scope of the invention.

The open-loop regulator 222, being designed and constructed to calculate the zenith current used to approximately achieve the setpoint-average current, can thus quickly create an open-loop average current that may differ from setpoint-average current by an acceptable margin (e.g., within 10% of the setpoint average current). For example, when an automobile's starter is cranking the engine, the battery voltage may fall below 10V, and in some cases around 4-5V, and then return to about 12V when cranking ceases. During periods when the closed-loop regulator 220 is out of regulation because of the drop in battery 100 voltage (or the abrupt return to nominal), the open-loop regulator 222 may bring the open-loop average current to within the acceptable margin within 100 microseconds (μs) or less, in some cases within 75 μs, and in a particular case about 50 ρs. As another example, for various reasons the ECU 102 may command the LED module 100 to bypass one or more LEDs in the group of LEDs 110 (e.g., when switch 134 (FIG. 1) is made conductive). During periods when the closed-loop regulator 220 is out of regulation because of the change in the load, the open-loop regulator 222 may bring the open-loop average current to within the acceptable margin within 100 microseconds µs or less of the load-change event, in some cases within 75 µs of the load-change event, and in a particular case about 50 µs of the load-change event.

Figure 8:
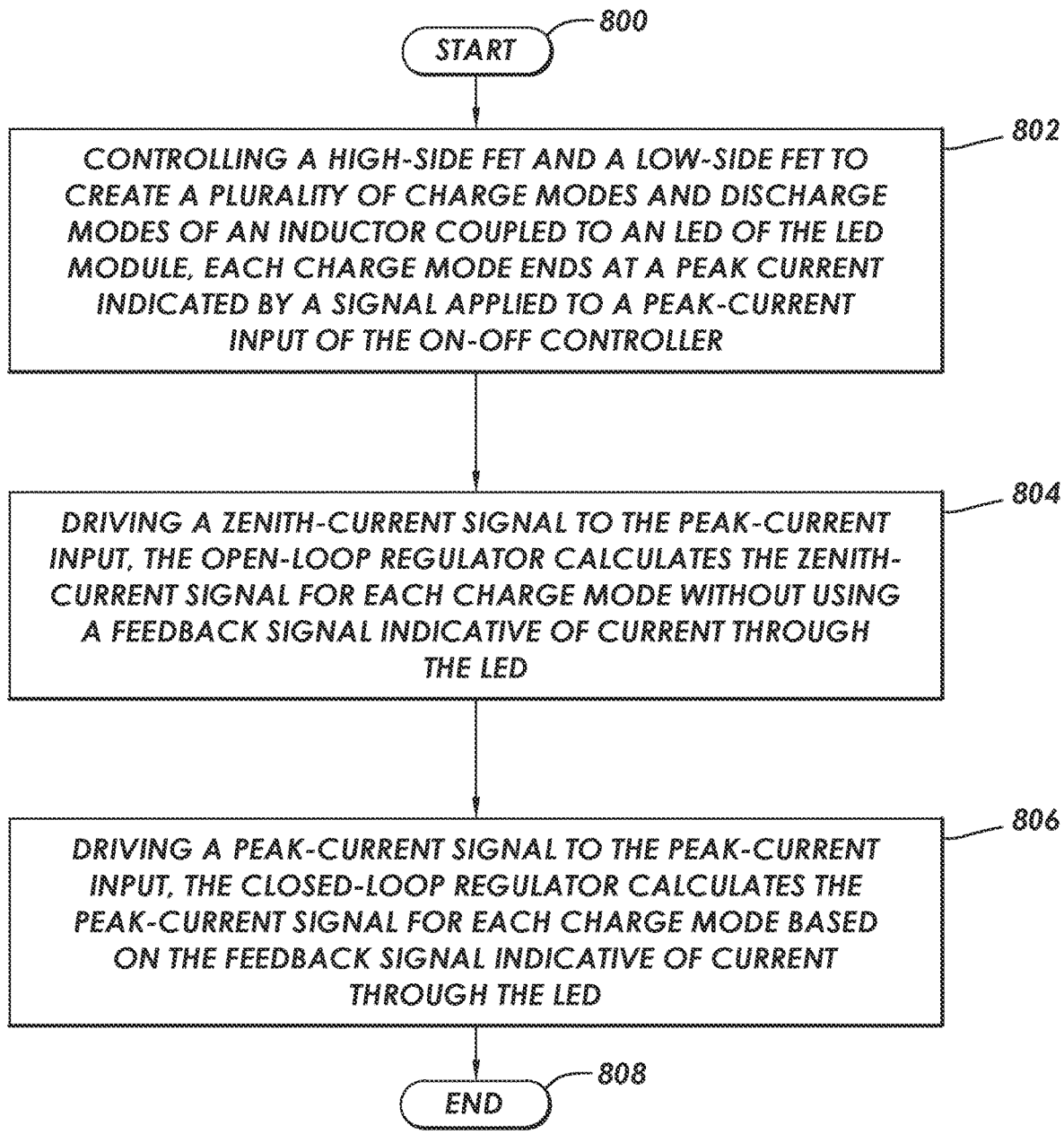
FIG. 8 shows a method in accordance with at least some embodiments.

FIG. 8 shows a method in accordance with at least some embodiments. In particular, the method starts (block 800) and comprises: controlling, by an on-off controller, a high-side FET and a low-side FET to create a plurality of charge modes and discharge modes of an inductor coupled to an LED of the LED module, each charge mode ends at a peak current indicated by a signal applied to a peak-current input of the on-off controller (block 802); driving, by an open-loop regulator, a zenith-current signal to the peak-current input, the open-loop regulator calculates the zenith-current signal for each charge mode without using a feedback signal indicative of current through the LED (block 804); and driving, by a closed-loop regulator, a peak-current signal to the peak-current input, the closed-loop regulator calculates the peak-current signal for each charge mode based on the feedback signal indicative of current through the LED (block 806). Thereafter, the method ends (block 808).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating an LED module, the method comprising:
   controlling, by an on-off controller, a high-side FET and a low-side FET to create a plurality of charge modes and discharge modes of an inductor coupled to an LED of the LED module, each charge mode ends at a peak current indicated by a signal applied to a peak-current input of the on-off controller;
   driving, by an open-loop regulator, a zenith-current signal to the peak-current input, the open-loop regulator calculates the zenith-current signal for each charge mode without using a feedback signal indicative of current through the LED; and then
   driving, by a closed-loop regulator, a peak-current signal to the peak-current input, the closed-loop regulator calculates the peak-current signal for each charge mode based on the feedback signal indicative of current through the LED.

2. The method of claim 1 wherein driving the zenith-current signal further comprises calculating, by the open-loop regulator, the zenith-current signal based on an average-current setpoint and a voltage at a switch node of the LED module.

3. The method of claim 1 wherein driving the zenith-current signal further comprises creating, by the open-loop regulator, the zenith-current signal based on an average-current setpoint and a peak increment indicative of a difference between the average-current setpoint and a zenith current.

4. The method of claim 1 wherein driving the zenith-current signal further comprises creating, by the open-loop regulator, the zenith-current signal based on an average-current setpoint, a peak increment indicative of a difference between the average-current setpoint and a zenith current, and a compensation increment indicative of slope compensation.

5. The method of claim 1 further comprising switching from driving the zenith-current signal to driving the peak-current signal when a regulation signal indicates stabilization of the closed-loop regulator.

6. The method of claim 1 further comprising, after driving the peak-current signal, driving the zenith-current signal by the open-loop regulator when a regulation signal indicates the closed-loop regulator has lost stabilization.

7. The method of claim 1 wherein controlling the high-side FET and the low-side FET further comprises applying slope compensation to the peak-current input, and ending each charge mode at the peak current determined based on the peak-current input and the slope compensation.

8. An LED driver comprising:
   a setpoint terminal, an input-voltage terminal, a switch-node terminal, and a return terminal;
   a high-side FET defining a drain coupled to the input-voltage terminal, a source coupled to the switch-node terminal, and a high gate;
   a low-side FET defining a drain coupled to the switch-node terminal, a source coupled to the return terminal, and a low gate;
   an on-off controller defining a peak-current input and coupled to the high gate and the low gate, the on-off controller configured to: assert the high gate and de-assert the low gate to create charge modes of an inductor, and each time a peak current indicated by a signal applied to the peak-current input is reached, de-assert the high gate and assert the low gate to create discharge modes of the inductor;
   a multiplexer defining a closed-loop input, an open-loop input, a select input, and a select output, the select output coupled to the peak-current input;
   a closed-loop regulator coupled to the closed-loop input, the closed-loop regulator configured to drive a peak-current signal to the closed-loop input, the peak-current signal created based on a feedback signal indicative of current to the switch-node terminal; and
   an open-loop regulator coupled to the open-loop input, the open-loop regulator configured to drive a zenith-current signal to open-loop input, the zenith-current signal created without using the feedback signal.

9. The LED driver of claim 8 further comprising a detector coupled to the select input of the multiplexer, the detector configured to assert the select input upon detection that the closed-loop regulator is stabilized.

10. The LED driver of claim 8 further comprising a detector coupled to the select input of the multiplexer, the detector configured to de-assert the select input upon detection that the closed-loop regulator is out of stabilization.

11. The LED driver of claim 8 wherein when the open-loop regulator drives the zenith-current signal, the open-loop regulator is further configured to calculate the zenith-current signal based on an average-current setpoint and a voltage at the switch-node terminal.

12. The LED driver of claim 8 wherein when the open-loop regulator drives the zenith-current signal, the open-loop regulator is further configured to create the zenith-current signal based on an average-current setpoint and a peak increment indicative of a difference between the average-current setpoint and an expected peak current.

13. The LED driver of claim 8 wherein when the open-loop regulator drives the zenith-current signal, the open-loop regulator is further configured to create the zenith-current signal based on an average-current setpoint, a peak increment indicative of a difference between the average-current setpoint and an expected peak current, and a compensation increment indicative of slope compensation.

14. The LED driver of claim 8 wherein the on-off controller is further configured to apply a slope compensation to a signal received on the peak-current input, and end each charge mode at the peak current determined based on the peak-current input and the slope compensation.

15. An LED module comprising:
an LED;
an inductor defining a first lead coupled to an anode of the LED, and a second lead defining a switch node;
a setpoint resistor defining a first lead coupled to a reference voltage and a second lead, a resistance of the setpoint resistor is proportional to an average-current setpoint for the LED;
a driver comprising:
  a high-side FET defining a drain coupled to a voltage input, a source coupled to the switch node, and a high gate;
  a low-side FET defining a drain coupled to the switch node, a source coupled to a return, and a low gate;
  an on-off controller defining a peak-current input and coupled to the high gate and the low gate, the on-off controller configured to: assert the high gate and de-assert the low gate to create charge modes of the inductor; and each time a peak current indicated by a signal applied to the peak-current input is reached, de-assert the high gate and assert the low gate to create discharge modes of the inductor;
  a multiplexer coupled to the peak-current input and defining an open-loop input, a closed-loop input, and a select input;
  a closed-loop regulator configured to drive a peak-current signal to the closed-loop input, the peak-current signal created based on a feedback signal indicative of current to the switch node; and
  an open-loop regulator configured to drive a zenith-current signal to the open-loop input, the zenith-current signal created without using the feedback signal.

16. The LED module of claim 15 further comprising a detector configured to assert the select input upon detection that the closed-loop regulator is stabilized.

17. The LED module of claim 15 wherein when the open-loop regulator drives the zenith-current signal, the open-loop regulator is further configured to create the zenith-current signal based on the average-current setpoint and a voltage at the switch node.

18. The LED module of claim 15 wherein when the open-loop regulator drives the zenith-current signal, the open-loop regulator is further configured to create the zenith-current signal based on the average-current setpoint and a peak increment indicative of a difference between the average-current setpoint and an expected peak current.

19. The LED module of claim 15 wherein when the open-loop regulator drives the zenith-current signal, the open-loop regulator is further configured to create the zenith-current signal based on the average-current setpoint, a peak increment indicative of a difference between the average-current setpoint and an expected peak current, and a compensation increment indicative of slope compensation.

20. The LED module of claim 15 wherein the on-off controller is further configured to apply a slope compensation to a signal received on the peak-current input, and end each charge mode at the peak current determined based on the peak-current input and the slope compensation.

* * * * *